United States Patent
Hsu et al.

(10) Patent No.: US 10,320,058 B2
(45) Date of Patent: Jun. 11, 2019

(54) PORTABLE ELECTRONIC DEVICE AND BACK COVER ASSEMBLY THEREOF

(71) Applicant: INPAQ TECHNOLOGY CO., LTD., Miaoli County (TW)

(72) Inventors: Po-Kai Hsu, New Taipei (TW); Chih-Ming Su, Taipei (TW)

(73) Assignee: INPAQ TECHNOLOGY CO., LTD., Miaoli County (TW)

( * ) Notice: Subject to any disclaimer, the term of this patent is extended or adjusted under 35 U.S.C. 154(b) by 59 days.

(21) Appl. No.: 15/628,721

(22) Filed: Jun. 21, 2017

(65) Prior Publication Data

US 2018/0287245 A1  Oct. 4, 2018

(30) Foreign Application Priority Data

Mar. 29, 2017  (TW) .............................. 106110516 A

(51) Int. Cl.
| | | |
|---|---|---|
| *H01Q 1/24* | (2006.01) | |
| *H01Q 1/38* | (2006.01) | |
| *H04B 5/00* | (2006.01) | |
| *H01Q 1/22* | (2006.01) | |
| *A45C 11/00* | (2006.01) | |
| *H04B 1/3888* | (2015.01) | |

(52) U.S. Cl.
CPC .............. *H01Q 1/243* (2013.01); *H01Q 1/38* (2013.01); *H04B 5/00* (2013.01); *H04B 5/0031* (2013.01); *H04B 5/0081* (2013.01); *A45C 2011/002* (2013.01); *H01Q 1/2208* (2013.01); *H04B 1/3888* (2013.01)

(58) Field of Classification Search
CPC .......... H01Q 1/22–2208; H01Q 1/243; H01Q 7/00–08; H04B 1/38–3888; H04B 5/0081
See application file for complete search history.

(56) References Cited

U.S. PATENT DOCUMENTS

| | | | |
|---|---|---|---|
| 2016/0164178 A1* | 6/2016 | Komachi | .................. H01Q 1/38 343/702 |
| 2016/0198028 A1* | 7/2016 | Orihara | ................ H01Q 1/2225 455/575.7 |
| 2017/0012343 A1* | 1/2017 | Wang | .................... H01Q 1/243 |

* cited by examiner

*Primary Examiner* — Dameon E Levi
*Assistant Examiner* — Hasan Z Islam
(74) *Attorney, Agent, or Firm* — Li & Cai Intellectual Property (USA) Office

(57) ABSTRACT

The present disclosure provides a portable electronic device and a back cover assembly thereof. The back cover assembly includes a substrate structure and a coil structure. The substrate structure includes a metal substrate and a first non-metal substrate connected with the metal substrate. The coil structure is matched with an IC chip for generating an antenna magnetic field that passes through the first non-metal substrate without matching with the metal substrate. The coil structure has a first coil portion and a second coil portion connected to the first coil portion, the first coil portion is disposed above the metal substrate, the second coil portion is disposed above the first non-metal substrate, and the percentage of the first coil portion to the coil structure is larger than that the percentage of the second coil portion to the coil structure.

9 Claims, 10 Drawing Sheets

PORTABLE ELECTRONIC DEVICE AND BACK COVER ASSEMBLY THEREOF

FIELD OF THE INVENTION

The present disclosure relates to an electronic device and a back cover assembly thereof, and more particularly to a portable electronic device and a back cover assembly thereof.

BACKGROUND OF THE INVENTION

Near field communication is a short-range high-frequency wireless communication technology in which interconnection and intercommunication between electronic devices within a short distance can be realized by using magnetic induction principle. Because the near field communication provides great convenience to the transmission, management, and storage of information and tends to transact within a short distance, it is quite suitable for the exchange of important information, such as financial information or personal information. Many of today's consumer electronics, such as mobile phones, personal digital assistants (PDAs), tablet personal computers, notebook computers, etc., have been equipped with near field communication chips to perform personal identification, information exchange, or transaction payments.

However, when a near field communication antenna is integrated into an electronic device, high-frequency signals thus generated are possibly affected by the metal casing or other metal devices of the electronic device. As a result, the signals receivable and transmittable by the near field communication antenna are weakened, or the signals cannot even be received or transmitted. In order to avoid the effects caused by these devices, considerable restrictions are imposed on the location of the near field communication antenna disposed in the electronic device and the area of the near field communication antenna. In addition, due to the limitation of area, the size of the near field communication antenna becomes smaller and smaller. The difference in antenna size will lead to weak coupling of magnetic fields, thus inhibiting the ability of the near field communication antenna to transmit energy.

SUMMARY OF THE INVENTION

One aspect of the present disclosure relates to a portable electronic device and a back cover assembly thereof.

One of the embodiments of the present disclosure provides a back cover assembly, comprising a substrate structure, an insulation structure, and a coil structure. The substrate structure includes a metal substrate and a first non-metal substrate connected with the metal substrate. The insulation structure includes a first insulation layer disposed on the metal substrate and the first non-metal substrate. The coil structure is surroundingly disposed on the first insulation layer to electrically connect to an IC chip. More particularly, the coil structure has a first coil portion and a second coil portion connected to the first coil portion, the first coil portion is disposed on the first insulation layer and above the metal substrate, the second coil portion is disposed on the first insulation layer and above the first non-metal substrate, and the percentage of the first coil portion to the coil structure is larger than that the percentage of the second coil portion to the coil structure.

Another one of the embodiments of the present disclosure provides a portable electronic device using a back cover assembly, characterized in that the back cover assembly comprises a substrate structure, an insulation structure, and a coil structure. The substrate structure includes a metal substrate and a first non-metal substrate connected with the metal substrate. The insulation structure includes a first insulation layer disposed on the metal substrate and the first non-metal substrate. The coil structure is surroundingly disposed on the first insulation layer to electrically connect to an IC chip. More particularly, the coil structure has a first coil portion and a second coil portion connected to the first coil portion, the first coil portion is disposed on the first insulation layer and above the metal substrate, the second coil portion is disposed on the first insulation layer and above the first non-metal substrate, and the percentage of the first coil portion to the coil structure is larger than that the percentage of the second coil portion to the coil structure.

Yet another one of the embodiments of the present disclosure provides a back cover assembly, comprising a substrate structure and a coil structure. The substrate structure includes a metal substrate and a first non-metal substrate connected with the metal substrate, and the first non-metal substrate and the metal substrate are mated with each other to form a back cover structure that is assembled on a back side of a portable electronic device. The coil structure is matched with an IC chip for generating an antenna magnetic field that passes through the first non-metal substrate without matching with the metal substrate. More particularly, the coil structure has a first coil portion and a second coil portion connected to the first coil portion, the first coil portion is disposed above the metal substrate, the second coil portion is disposed above the first non-metal substrate, and the percentage of the first coil portion to the coil structure is larger than that the percentage of the second coil portion to the coil structure.

Therefore, the coil structure is matched with the IC chip for generating an antenna magnetic field that can pass through the first non-metal substrate without matching with the metal substrate by matching the features of "the substrate structure including a metal substrate and a first non-metal substrate connected with the metal substrate" and "the coil structure having a first coil portion and a second coil portion connected to the first coil portion, the first coil portion being disposed above the metal substrate, the second coil portion being disposed above the first non-metal substrate, and the percentage of the first coil portion to the coil structure being larger than that the percentage of the second coil portion to the coil structure".

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a portable electronic device and a back cover assembly thereof according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

First Embodiment

Referring to FIG. 1 to FIG. 4, the first embodiment of the present disclosure provides a back cover assembly S and a portable electronic device P using the back cover assembly S. The back cover assembly S includes a substrate structure 1, an insulation structure 2, and a coil structure 3.

Figure 1:
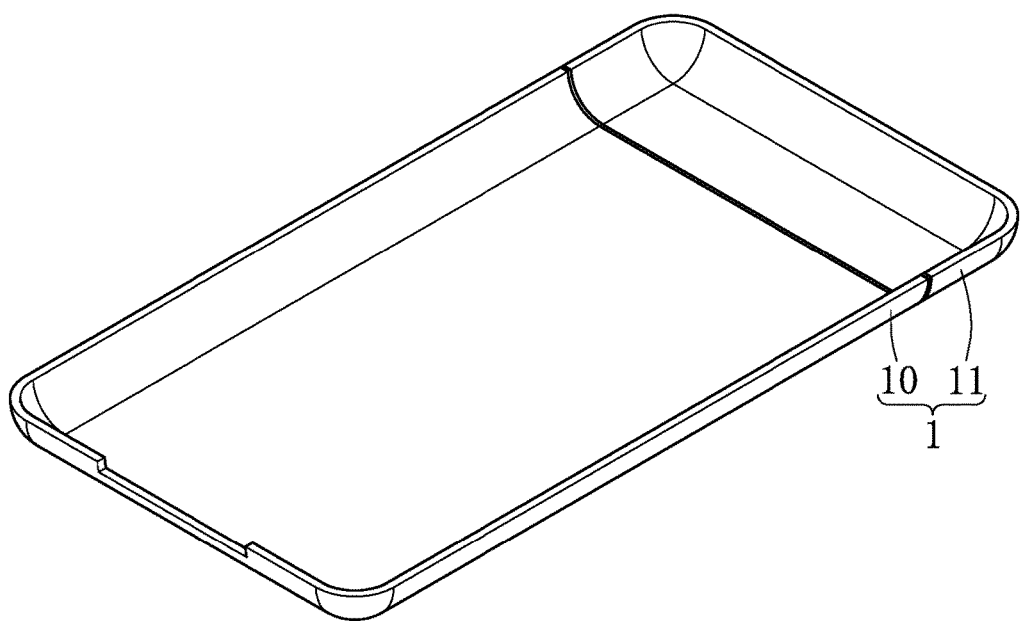
FIG. 1 shows a perspective, schematic view of the substrate structure of the back cover assembly according to the first embodiment of the present disclosure.
Figure 2:
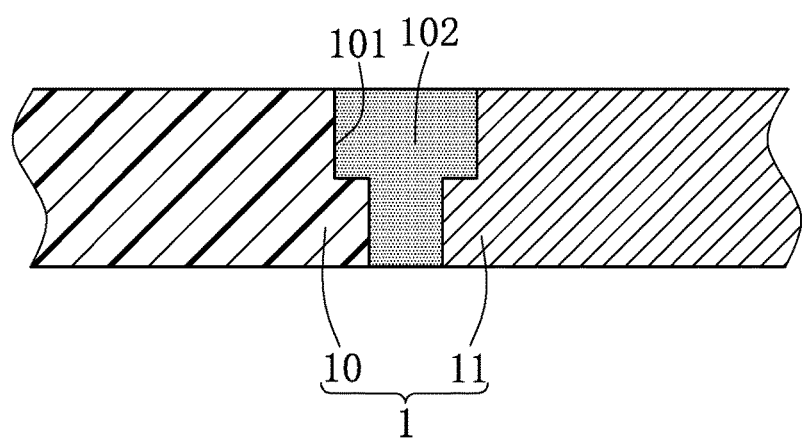
FIG. 2 shows a partial, cross-sectional, schematic view of the substrate structure of the back cover assembly according to the first embodiment of the present disclosure.

First, referring to FIG. 1 and FIG. 2, the substrate structure 1 includes a metal substrate 10 and a first non-metal substrate 11 connected with the metal substrate 10. More particularly, as shown in FIG. 2, the substrate structure 1 has a first passing slot 101 connected between the metal substrate 10 and the first non-metal substrate 11, and a first connection body 102 for filling the first passing slot 101 and connecting between the metal substrate 10 and the first non-metal substrate 11. For example, the first non-metal substrate 11 may be a first insulation substrate that is made of insulation material, and the first connection body 102 may be a first insulation gel that is made of insulation material, but that is merely an example and is not meant to limit the scope of the present disclosure.

Figure 3:
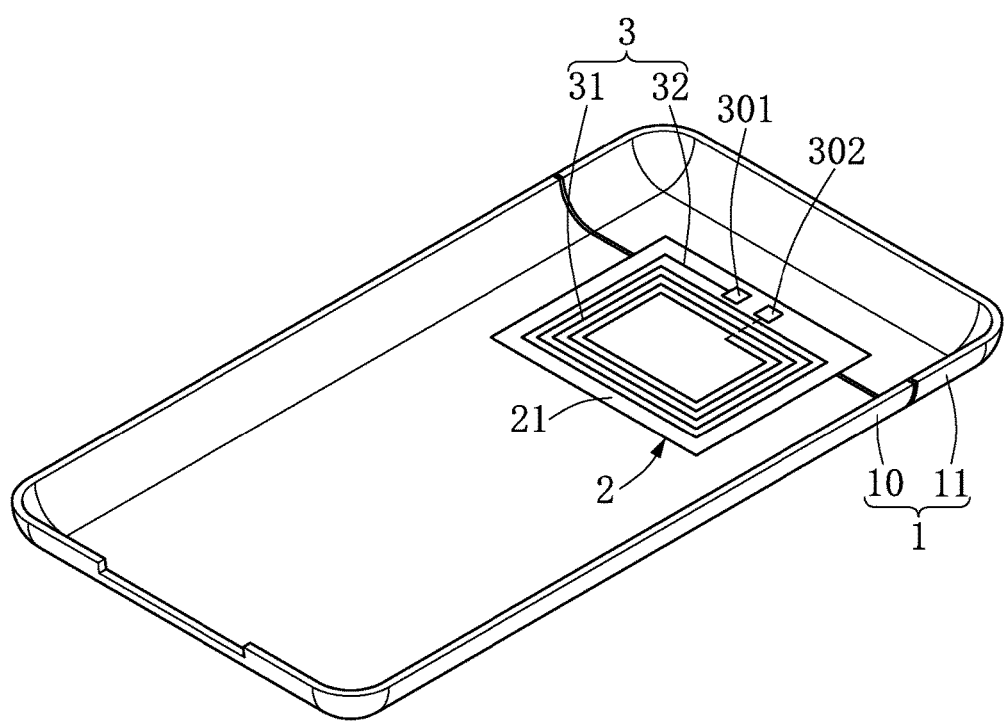
FIG. 3 shows a perspective, schematic view of the insulation structure and the coil structure of the back cover assembly disposed on the substrate structure according to the first embodiment of the present disclosure.

Moreover, referring to FIG. 1 to FIG. 3, the insulation structure 2 includes a first insulation layer 21 disposed on the metal substrate 10 and the first non-metal substrate 11, and the coil structure 3 is surroundingly disposed on the first insulation layer 21 so as to insulate the coil structure 3 from the metal substrate 10. For example, the coil structure 3 may be an antenna structure (such as RFID antenna) with a predetermined layout pattern that is made of conductive material, but that is merely an example and is not meant to limit the scope of the present disclosure. More particularly, the coil structure 3 has a first coil portion 31 and a second coil portion 32 connected to the first coil portion 31. In addition, the first coil portion 31 is disposed on the first insulation layer 21 and above the metal substrate 10, and the second coil portion 32 is disposed on the first insulation layer 21 and above the first non-metal substrate 11. It should be noted that the percentage of the first coil portion 31 to the coil structure 3 is larger than that the percentage of the second coil portion 32 to the coil structure 3. For example, the percentage of the first coil portion 31 to the coil structure 3 is within the range of about 55% to 95% (the range of about 85% to 95% is optimum), and the percentage of the second coil portion 32 to the coil structure 3 is within the range of about 5% to 45% (the range of about 5% to 15% is optimum). That is to say, the percentage of the first coil portion 31 to the coil structure 3 is larger about 70%-90% than that of the percentage of the second coil portion 32 to the coil structure 3, but that is merely an example and is not meant to limit the scope of the present disclosure.

Figure 4:
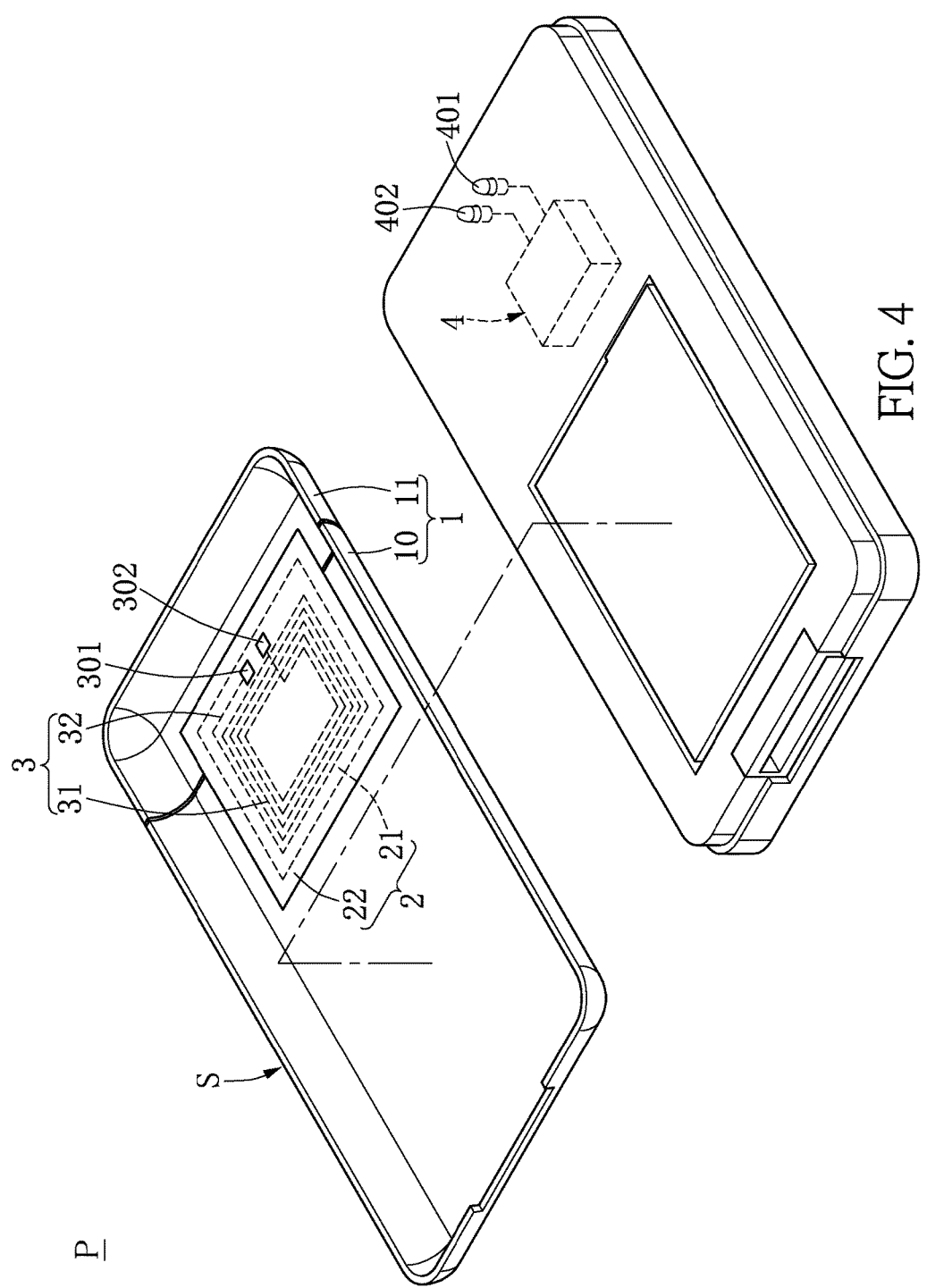
FIG. 4 shows a perspective, exploded, schematic view of the portable electronic device according to the first embodiment of the present disclosure.

More particularly, referring to FIG. 3 and FIG. 4, the insulation structure 2 further includes a second insulation layer 22 disposed on the first insulation layer 21 to cover the coil structure 3 (that is to say, the coil structure is encapsulated between the first insulation layer 21 and the second insulation layer 22), and the coil structure 3 has a first feeding point 301 and a second feeding point 302 that are exposed from the second insulation layer 22. It should be noted that the first non-metal substrate 11 and the metal substrate 10 are mated with each other to form a back cover structure that is assembled on a back side of the portable electronic device P. When the back cover assembly 1 (the back cover structure) is assembled on the back side of the portable electronic device P, the first feeding point 301 and the second feeding point 302 of the coil structure 3 can respectively electrically contact a first conductive contact 401 and a second conductive contact 402 of an IC chip 4, so that the coil structure 3 can be electrically connected to the IC chip 4.

In conclusion, referring to FIG. 1 and FIG. 4, the first embodiment of the present disclosure provides a back cover assembly S, comprising a substrate structure 1 and a coil structure 3. The substrate structure 1 includes a metal substrate 10 and a first non-metal substrate 11 connected with the metal substrate 10. The first non-metal substrate 11 and the metal substrate 10 are mated with each other to form a back cover structure that is assembled on a back side of a portable electronic device P. The coil structure 3 is matched with an IC chip 4 for generating an antenna magnetic field that passes through the first non-metal substrate 11 without matching with the metal substrate 10. The coil structure 3 has a first coil portion 31 and a second coil portion 32 connected to the first coil portion 31. The first coil portion 31 is disposed on a first predetermined position above the metal substrate 10, the second coil portion 32 is disposed on a second predetermined position above the first non-metal substrate 11, and the percentage of the first coil portion 31 to the coil structure 3 is larger than that the percentage of the second coil portion 32 to the coil structure 3.

Therefore, the antenna magnetic field generated by matching the coil structure 3 and the IC chip 4, can directly pass through the first non-metal substrate 11, and can be shielded by the metal substrate 10 and cannot match with the metal substrate 10. More particularly, the antenna magnetic field generated by matching the coil structure 3 and the IC chip 4 can pass through the first non-metal substrate 11 and work in front of the metal substrate 10 without matching with the metal substrate 10.

Second Embodiment

Figure 5:
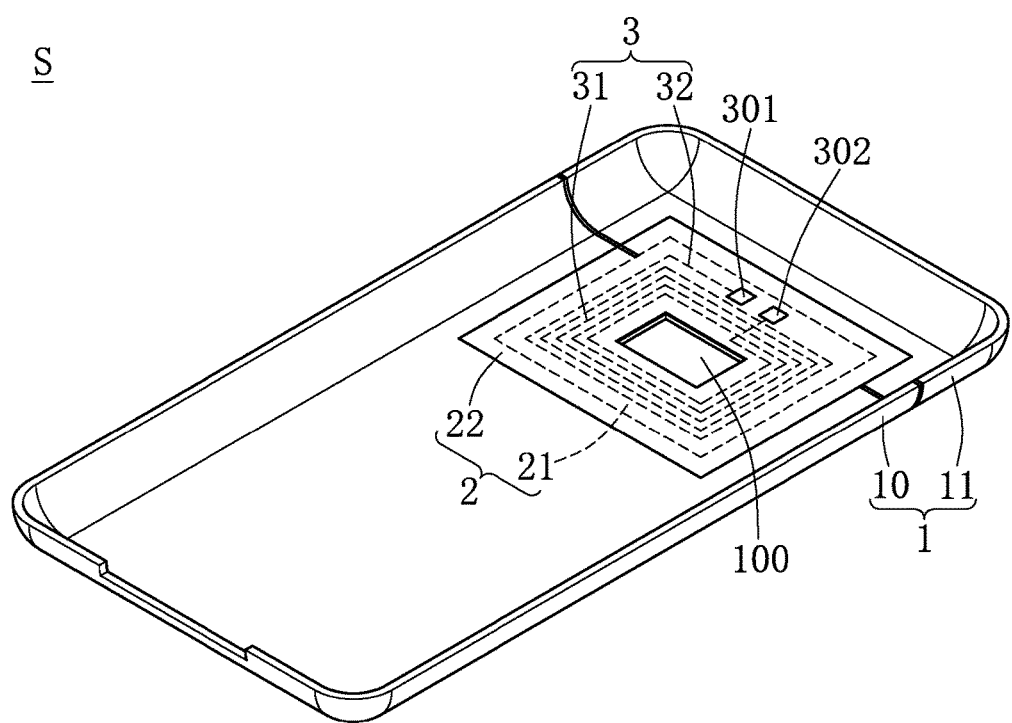
FIG. 5 shows a perspective, schematic view of the back cover assembly according to the second embodiment of the present disclosure.
Figure 6:
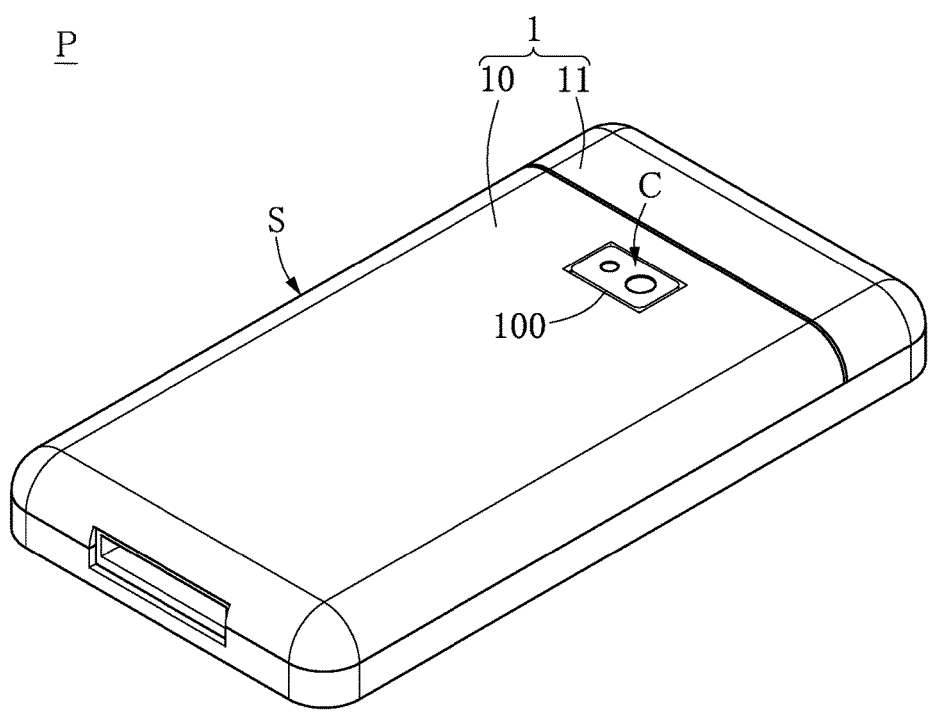
FIG. 6 shows a perspective, schematic view of the portable electronic device according to the second embodiment of the present disclosure.

Referring to FIG. 5 and FIG. 6, the second embodiment of the present disclosure provides a back cover assembly S and a portable electronic device P using the back cover assembly S. The back cover assembly S includes a substrate structure 1, an insulation structure 2, and a coil structure 3. Comparing FIG. 5 with FIG. 4, the difference between the second embodiment and the first embodiment is as follows: referring to FIG. 5 and FIG. 6, in the second embodiment, the substrate structure 1 has at least one through opening 100 passing through the metal substrate 10 for exposing at least one lens module C of a portable electronic device P, and the at least one through opening 100 is disposed under a non-coil region that is surrounded by the coil structure 3. For example, the at least one lens module C can be replaced by a fingerprint identification module or other electronic module, or the at least one through opening 100 can be used to expose more than two electronic modules (such as a lens module and a fingerprint identification module) of the portable electronic device P at the same time, but that is merely an example and is not meant to limit the scope of the present disclosure.

Third Embodiment

Figure 7:
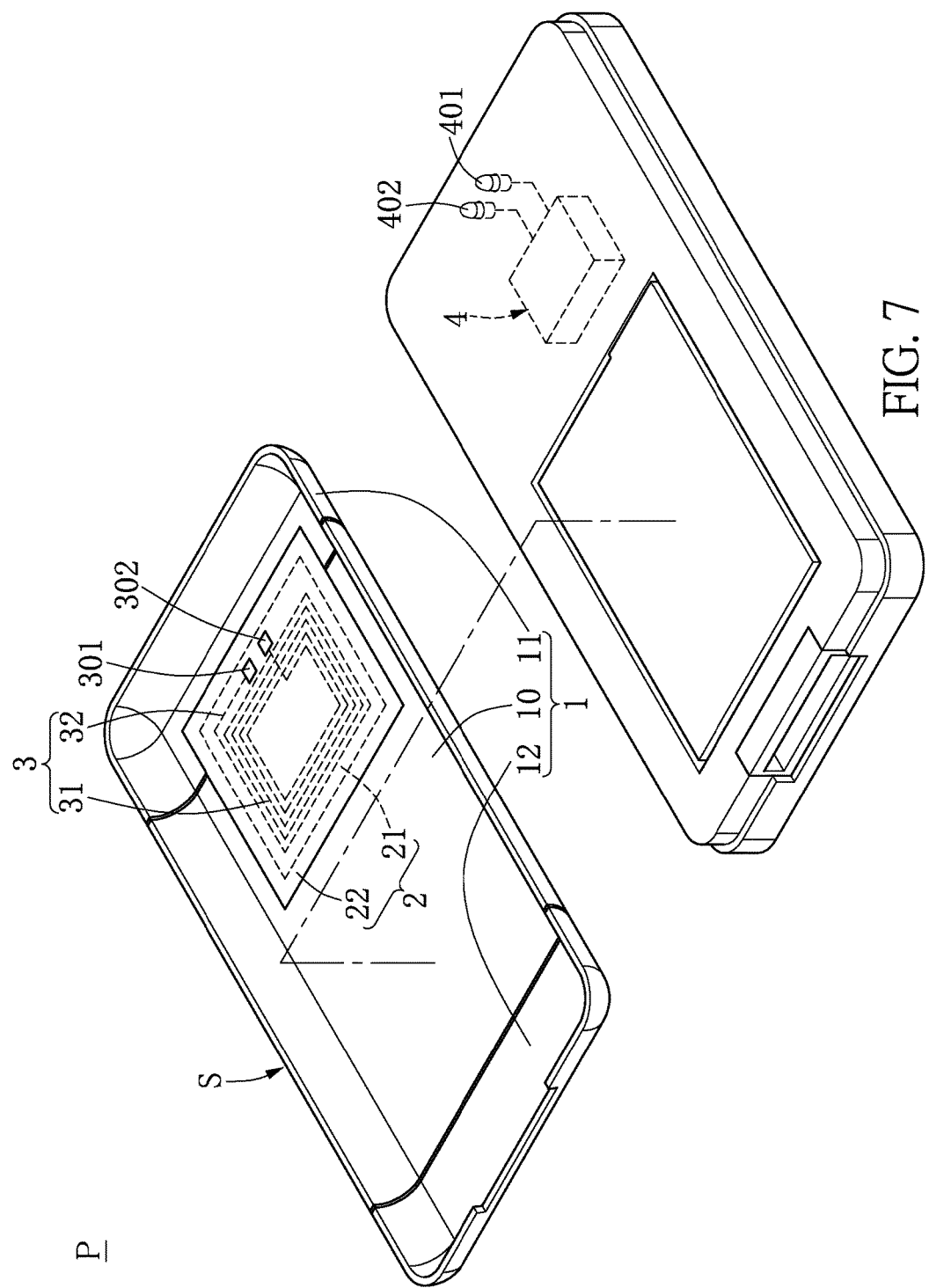
FIG. 7 shows a perspective, exploded, schematic view of the portable electronic device according to the third embodiment of the present disclosure.
Figure 8:
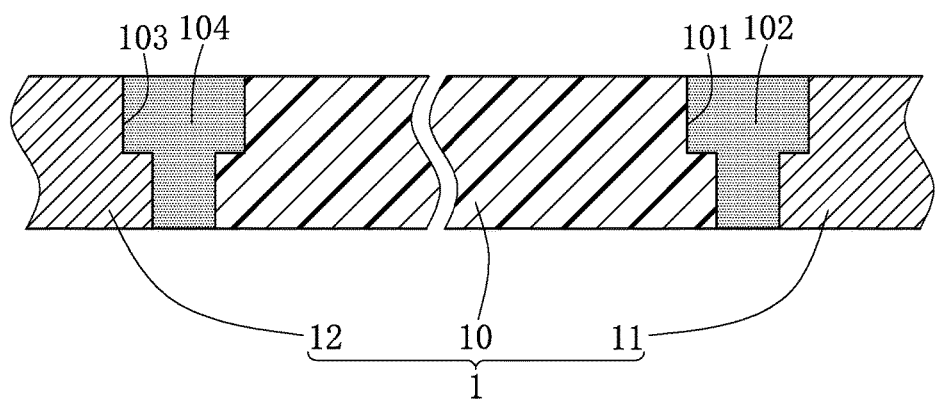
FIG. 8 shows a partial, cross-sectional, schematic view of the substrate structure of the back cover assembly according to the third embodiment of the present disclosure.

Referring to FIG. 7, the third embodiment of the present disclosure provides a back cover assembly S and a portable electronic device P using the back cover assembly S. The back cover assembly S includes a substrate structure 1, an insulation structure 2, and a coil structure 3. Comparing FIG. 7 with FIG. 4, the difference between the third embodiment and the first embodiment is as follows.

As shown in FIG. 7, in the third embodiment, the substrate structure 1 includes a first non-metal substrate 11 connected with the metal substrate 10 and a second non-metal substrate 12 connected with the metal substrate 10. In addition, the substrate structure 1 has a first passing slot 101 connected between the metal substrate 10 and the first non-metal substrate 11, a first connection body 102 for filling the first passing slot 101 and connecting between the metal substrate 10 and the first non-metal substrate 11, a second passing slot 103 connected between the metal substrate 10 and the second non-metal substrate 12, and a second connection body 104 for filling the second passing slot 103 and connecting between the metal substrate 10 and the second non-metal substrate 12. For example, the first non-metal substrate 11 may be a first insulation substrate that is made of insulation material, and the second non-metal substrate 12 may be a second insulation substrate that is made of insulation material. In addition, the first connection body 102 may be a first insulation gel that is made of insulation material, and the second connection body 104 may be a second insulation gel that is made of insulation material. However, that is merely an example and is not meant to limit the scope of the present disclosure.

It should be noted that the first non-metal substrate 11, the metal substrate 10, and the second non-metal substrate 12 are mated with each other to form a back cover structure that is assembled on a back side of the portable electronic device P as shown in FIG. 7. When the back cover assembly 1 (the back cover structure) is assembled on the back side of the portable electronic device P, the first feeding point 301 and the second feeding point 302 of the coil structure 3 can respectively electrically contact a first conductive contact 401 and a second conductive contact 402 of the IC chip 4, so that the coil structure 3 can be electrically connected to the IC chip 4.

Therefore, the antenna magnetic field generated by matching the coil structure 3 and the IC chip 4, can directly pass through the first non-metal substrate 11, and can be shielded by the metal substrate 10 and cannot match with the metal substrate 10. More particularly, the antenna magnetic field generated by matching the coil structure 3 and the IC chip 4 can pass through the first non-metal substrate 11 and work in front of the metal substrate 10 without matching with the metal substrate 10.

Fourth Embodiment

Figure 9:
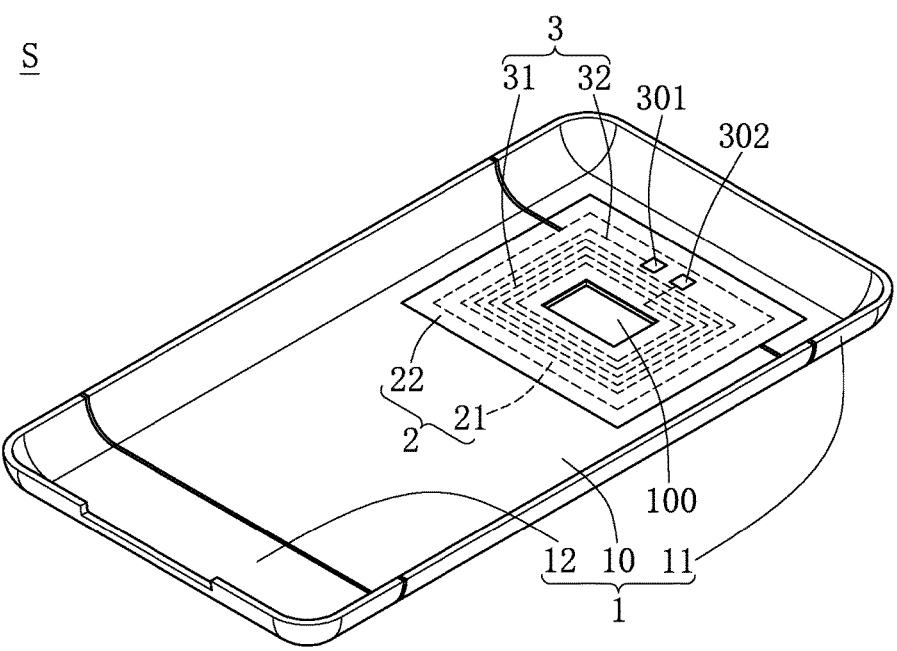
FIG. 9 shows a perspective, schematic view of the back cover assembly according to the fourth embodiment of the present disclosure.
Figure 10:
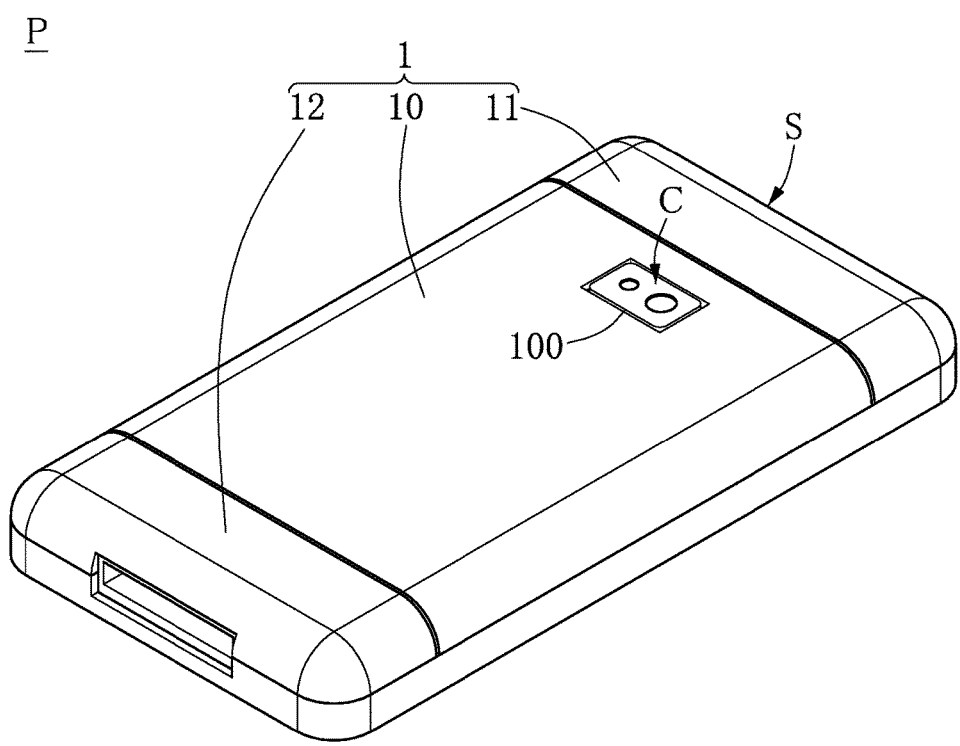
FIG. 10 shows a perspective, schematic view of the portable electronic device according to the fourth embodiment of the present disclosure.

Referring to FIG. 9 and FIG. 10, the fourth embodiment of the present disclosure provides a back cover assembly S and a portable electronic device P using the back cover assembly S. The back cover assembly S includes a substrate structure 1, an insulation structure 2, and a coil structure 3. Comparing FIG. 9 with FIG. 7, the difference between the fourth embodiment and the third embodiment is as follows: referring to FIG. 9 and FIG. 10, in the fourth embodiment, the substrate structure 1 has at least one through opening 100 passing through the metal substrate 10 for exposing at least one lens module C of a portable electronic device P, and the at least one through opening 100 is disposed under a non-coil region that is surrounded by the coil structure 3.

Therefore, the coil structure 3 is matched with the IC chip 4 for generating an antenna magnetic field that can pass through the first non-metal substrate 11 without matching with the metal substrate 10 by matching the features of "the substrate structure 1 including a metal substrate 10 and a first non-metal substrate 11 connected with the metal substrate 10" and "the coil structure 3 having a first coil portion 31 and a second coil portion 32 connected to the first coil portion 31, the first coil portion 31 being disposed above the metal substrate 10, the second coil portion 32 being disposed above the first non-metal substrate 11, and the percentage of the first coil portion 31 to the coil structure 3 being larger than that the percentage of the second coil portion 32 to the coil structure 3".

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:
1. A back cover assembly, comprising:
a substrate structure including a metal substrate and a first non-metal substrate connected with the metal substrate;

an insulation structure including a first insulation layer disposed on the metal substrate and the first non-metal substrate; and a coil structure surroundingly disposed on the first insulation layer to electrically connect to an IC chip;

wherein the coil structure has a first coil portion and a second coil portion connected to the first coil portion, the first coil portion is disposed on the first insulation layer and above the metal substrate, the second coil portion is disposed on the first insulation layer and above the first non-metal substrate, and the percentage of the first coil portion to the coil structure is larger than that the percentage of the second coil portion to the coil structure.

2. The back cover assembly of claim 1, wherein the substrate structure has a first passing slot connected between the metal substrate and the first non-metal substrate and a first connection body for filling the first passing slot and connecting between the metal substrate and the first non-metal substrate, wherein the first non-metal substrate and the metal substrate are mated with each other to form a back cover structure that is assembled on a back side of the portable electronic device, wherein the insulation structure includes a second insulation layer disposed on the first insulation layer to cover the coil structure, and the coil structure has a first feeding point and a second feeding point that are exposed from the second insulation layer and electrically connected to the IC chip, wherein an antenna magnetic field generated by matching the coil structure and the IC chip directly passes through the first non-metal substrate without matching with the metal substrate.

3. The back cover assembly of claim 1, wherein the substrate structure includes a second non-metal substrate connected with the metal substrate, and the substrate structure has a first passing slot connected between the metal substrate and the first non-metal substrate, a first connection body for filling the first passing slot and connecting between the metal substrate and the first non-metal substrate, a second passing slot connected between the metal substrate and the second non-metal substrate, and a second connection body for filling the second passing slot and connecting between the metal substrate and the second non-metal substrate, wherein the first non-metal substrate, the metal substrate and the second non-metal substrate are mated with each other to form a back cover structure that is assembled on a back side of the portable electronic device, wherein the insulation structure includes a second insulation layer disposed on the first insulation layer to cover the coil structure, and the coil structure has a first feeding point and a second feeding point that are exposed from the second insulation layer and electrically connected to the IC chip, wherein an antenna magnetic field generated by matching the coil structure and the IC chip directly passes through the first non-metal substrate without matching with the metal substrate.

4. The back cover assembly of claim 1, wherein the substrate structure has at least one through opening passing through the metal substrate for exposing at least one lens module of a portable electronic device, and the at least one through opening disposed under a non-coil region that is surrounded by the coil structure, wherein the percentage of the first coil portion to the coil structure is within the range of about 55% to 95%, and the percentage of the second coil portion to the coil structure is within the range of about 5% to 45%.

5. The back cover assembly of claim 4, wherein the substrate structure has a first passing slot connected between the metal substrate and the first non-metal substrate and a first connection body for filling the first passing slot and connecting between the metal substrate and the first non-metal substrate, wherein the first non-metal substrate and the metal substrate are mated with each other to form a back cover structure that is assembled on a back side of the portable electronic device, wherein the insulation structure includes a second insulation layer disposed on the first insulation layer to cover the coil structure, and the coil structure has a first feeding point and a second feeding point that are exposed from the second insulation layer and electrically connected to the IC chip, wherein an antenna magnetic field generated by matching the coil structure and the IC chip directly passes through the first non-metal substrate without matching with the metal substrate.

6. The back cover assembly of claim 4, wherein the substrate structure includes a second non-metal substrate connected with the metal substrate, and the substrate structure has a first passing slot connected between the metal substrate and the first non-metal substrate, a first connection body for filling the first passing slot and connecting between the metal substrate and the first non-metal substrate, a second passing slot connected between the metal substrate and the second non-metal substrate, and a second connection body for filling the second passing slot and connecting between the metal substrate and the second non-metal substrate, wherein the first non-metal substrate, the metal substrate and the second non-metal substrate are mated with each other to form a back cover structure that is assembled on a back side of the portable electronic device, wherein the insulation structure includes a second insulation layer disposed on the first insulation layer to cover the coil structure, and the coil structure has a first feeding point and a second feeding point that are exposed from the second insulation layer and electrically connected to the IC chip, wherein an antenna magnetic field generated by matching the coil structure and the IC chip directly passes through the first non-metal substrate without matching with the metal substrate.

7. A portable electronic device using a back cover assembly, characterized in that the back cover assembly comprises:

a substrate structure including a metal substrate and a first non-metal substrate connected with the metal substrate;

an insulation structure including a first insulation layer disposed on the metal substrate and the first non-metal substrate; and a coil structure surroundingly disposed on the first insulation layer to electrically connect to an IC chip;

wherein the coil structure has a first coil portion and a second coil portion connected to the first coil portion, the first coil portion is disposed on the first insulation layer and above the metal substrate, the second coil portion is disposed on the first insulation layer and above the first non-metal substrate, and the percentage of the first coil portion to the coil structure is larger than that the percentage of the second coil portion to the coil structure.

8. The portable electronic device of claim 7, wherein the substrate structure has a first passing slot connected between the metal substrate and the first non-metal substrate and a first connection body for filling the first passing slot and connecting between the metal substrate and the first non-metal substrate, wherein the first non-metal substrate and the metal substrate are mated with each other to form a back cover structure that is assembled on a back side of the portable electronic device, wherein the insulation structure includes a second insulation layer disposed on the first insulation layer to cover the coil structure, and the coil structure has a first feeding point and a second feeding point that are exposed from the second insulation layer and electrically connected to the IC chip, wherein an antenna magnetic field generated by matching the coil structure and the IC chip directly passes through the first non-metal substrate without matching with the metal substrate.

9. The portable electronic device of claim 7, wherein the substrate structure includes a second non-metal substrate connected with the metal substrate, and the substrate structure has a first passing slot connected between the metal substrate and the first non-metal substrate, a first connection body for filling the first passing slot and connecting between the metal substrate and the first non-metal substrate, a second passing slot connected between the metal substrate and the second non-metal substrate, and a second connection body for filling the second passing slot and connecting between the metal substrate and the second non-metal substrate, wherein the first non-metal substrate, the metal substrate and the second non-metal substrate are mated with each other to form a back cover structure that is assembled on a back side of the portable electronic device, wherein the insulation structure includes a second insulation layer disposed on the first insulation layer to cover the coil structure, and the coil structure has a first feeding point and a second feeding point that are exposed from the second insulation layer and electrically connected to the IC chip, wherein an antenna magnetic field generated by matching the coil structure and the IC chip directly passes through the first non-metal substrate without matching with the metal substrate.

* * * * *